(12) United States Patent
Tanaka et al.

(10) Patent No.: US 8,386,147 B2
(45) Date of Patent: Feb. 26, 2013

(54) APPARATUS FOR CONTROLLING INTAKE AIR HEATING OF GAS TURBINE

(75) Inventors: Satoshi Tanaka, Takasago (JP); Shoichi Harada, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 378 days.

(21) Appl. No.: 12/667,991

(22) PCT Filed: Sep. 3, 2008

(86) PCT No.: PCT/JP2008/065805
§ 371 (c)(1),
(2), (4) Date: Mar. 2, 2010

(87) PCT Pub. No.: WO2009/031552
PCT Pub. Date: Mar. 12, 2009

(65) Prior Publication Data
US 2011/0004389 A1 Jan. 6, 2011

(30) Foreign Application Priority Data
Sep. 4, 2007 (JP) ................................. 2007-228451

(51) Int. Cl.
*G06F 19/00* (2011.01)
(52) U.S. Cl. ............... 701/100; 60/266; 60/604; 60/690
(58) Field of Classification Search .................. 700/100; 60/39.01, 782
See application file for complete search history.

(56) References Cited

U.S. PATENT DOCUMENTS

| 4,455,837 | A  | * | 6/1984  | Firey ................................ 60/670 |
| 6,836,086 | B1 | * | 12/2004 | Goldberg et al. ............. 318/141 |
| 7,269,956 | B2 | * | 9/2007  | Gericke et al. ................... 60/782 |
| 7,284,709 | B2 | * | 10/2007 | Guyer .......................... 237/12.1 |
| 7,540,141 | B2 | * | 6/2009  | Goldberg et al. ........... 60/39.281 |
| 8,015,826 | B2 | * | 9/2011  | Myers et al. ..................... 60/785 |
| 2006/0225430 | A1 | * | 10/2006 | Paprotna et al. ................ 60/782 |
| 2007/0240400 | A1 | * | 10/2007 | Smith et al. ................ 60/39.182 |
| 2010/0071372 | A1 | * | 3/2010  | Tanaka et al. ................... 60/730 |
| 2011/0004389 | A1 | * | 1/2011  | Tanaka et al. .................. 701/100 |

FOREIGN PATENT DOCUMENTS

| JP | 4-48921       |   | 8/1992  |
| JP | 09-317496     | * | 12/1997 |
| JP | 09317496 A    | * | 12/1997 |
| JP | 2003-161164   |   | 6/2003  |

(Continued)

*Primary Examiner* — Behrang Badii
*Assistant Examiner* — Charles J Han
(74) *Attorney, Agent, or Firm* — Kanesaka Berner & Partners, LLP

(57) ABSTRACT

In a heating apparatus for heating the air sucked into a gas turbine by a heat exchanger, the temperature fluctuation of the heated air is suppressed even in the period, for which a steam source to be fed to the heat exchanger is changed. For suppression, a heat exchanger is fed with both a self-can steam, the feed rate of which is controlled by a self-can steam control valve, and the auxiliary-steam, the feed rate of which is controlled by an auxiliary-steam control valve. At starting time, the quantity of the auxiliary-steam is reduced at a constant rate, and that of the self-can steam is increased while a feedback control and a feedforward control are being made. At stopping time, the quantity of the self-can steam is reduced at a constant rate, and that of the auxiliary-steam is increased while the feedback control and the feedforward control are being made.

2 Claims, 7 Drawing Sheets

FOREIGN PATENT DOCUMENTS

| | | |
|---|---|---|
| JP | 2006-313758 | 11/2006 |
| JP | 2008-128086 | 6/2008 |
| WO | WO 2008/062678 | 5/2008 |

* cited by examiner

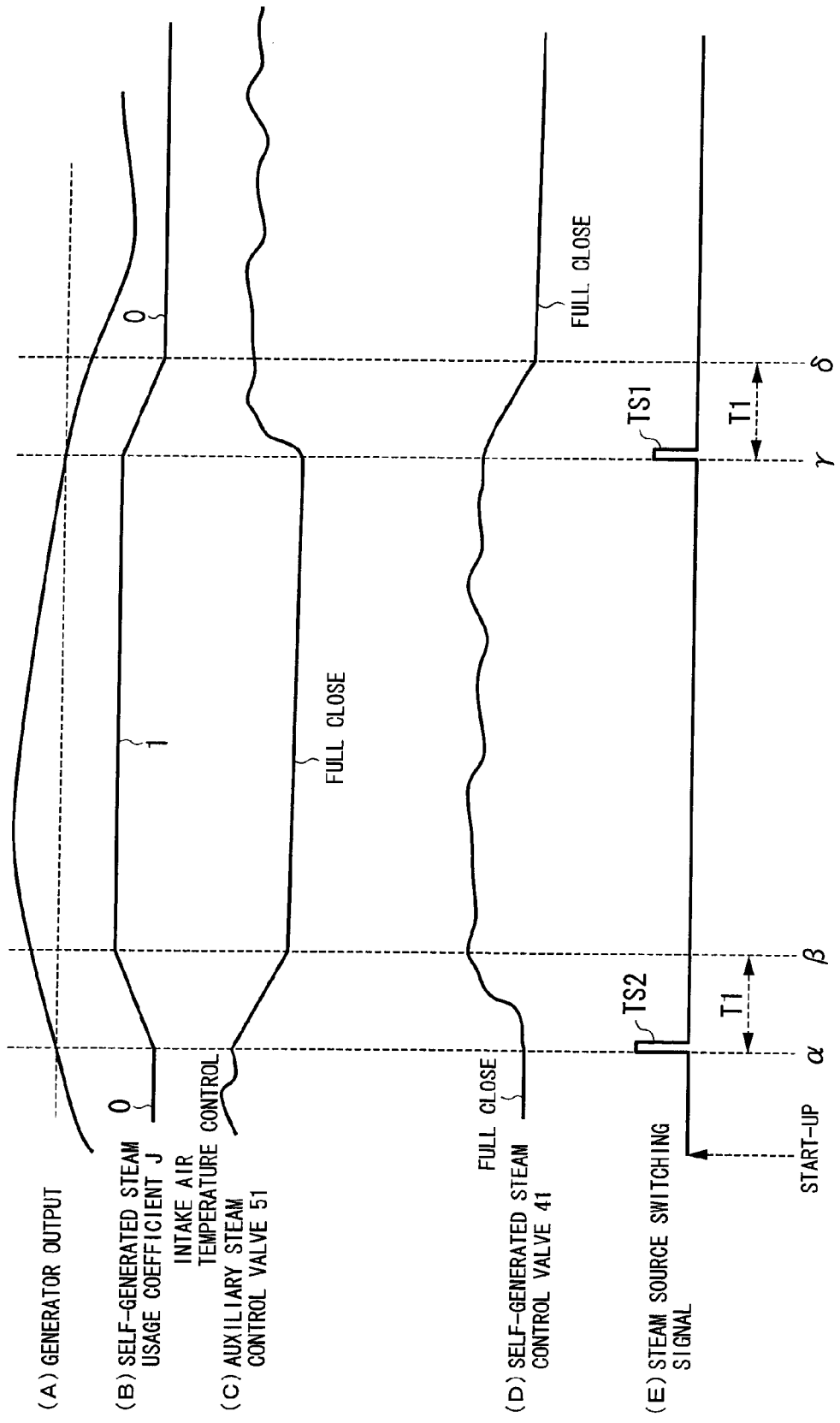

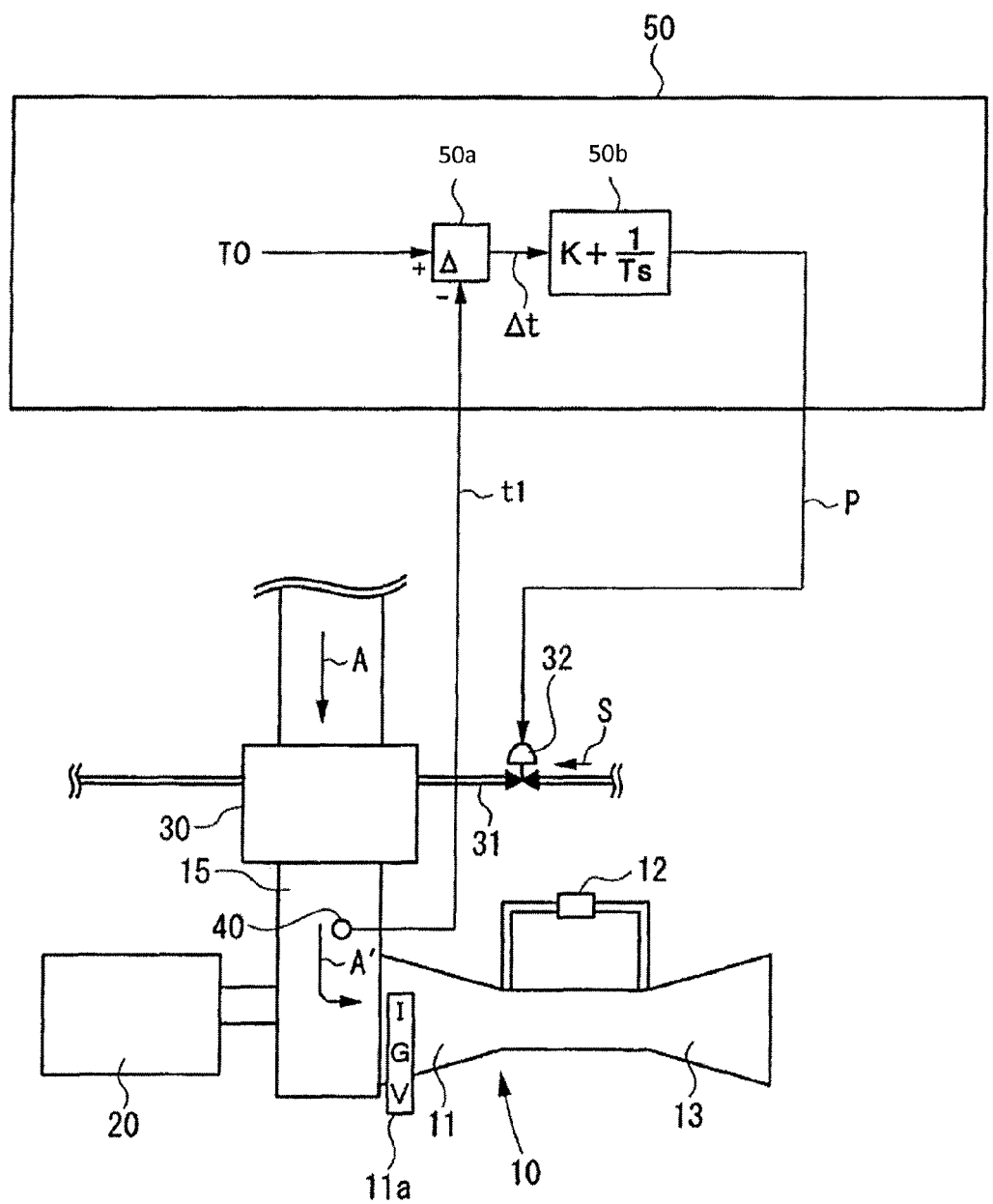

APPARATUS FOR CONTROLLING INTAKE AIR HEATING OF GAS TURBINE

CROSS-REFERENCE TO RELATED APPLICATIONS

The present application is based on International Application No. PCT/JP2008/065805, filed on Sep. 3, 2008, which in turn corresponds to Japanese Application No. 2007-228451 filed on Sep. 4, 2007, and priority is hereby claimed under 35 USC §119 based on these applications. Each of these applications are hereby incorporated by reference in their entirety into the present application.

TECHNICAL FIELD

The present invention relates to an apparatus for controlling intake air heating of a gas turbine.

More specifically, the present invention is devised so as to maintain a temperature of intake air constant even if a steam source is changed in an intake air heating apparatus of a gas turbine which heats air taken by the gas turbine by steam.

BACKGROUND ART

In a gas turbine installed in a cold area, after air taken from atmosphere is heated, it is taken by the gas turbine.

The reason why intake air is heated in this manner is because, when dense external air (air) falling within an extremely lower temperature range (for example, −20° C. to −30° C.) is taken by a gas turbine as it is, stable combustion of the gas turbine cannot be assured due to lowering of ignition performance or occurrence of combustion vibrations. When air with such an extremely low temperature is taken by the gas turbine, there is such a possibility that moisture in the air is frozen at an inlet of the gas turbine, and frozen ice enters the gas turbine to damage a turbine vane or the like.

In a gas turbine installed in a cold area, therefore, after air is heated by a heating apparatus such as a heat exchanger, it is taken by the gas turbine. In this case, an air temperature is heated up to a temperature (for example, a temperature of about +5° C.) at which the gas turbine can perform stable combustion.

FIG. 5 shows a conventional example of a gas turbine plant installed in a cold area. As shown in FIG. 5, a gas turbine 10 includes a compressor 11, a combustor 12, and a turbine 13 as main members. Air (atmosphere) "A" taken from the outside is taken by the compressor 11 of the gas turbine 10 via an intake air duct 15.

An inlet guide vane (IGV) 11a is provided at an inlet port of the compressor 11, and an air amount taken by the compressor is controlled according to an opening of the IGV 11a. Incidentally, the opening of the IGV 11a is controlled in response to a load state, an operating state, or the like.

A generator 20 is coupled to the gas turbine 10 and it is rotationally driven by the gas turbine 10 to generate electric power.

A heat exchanger 30 for heating intake air is arranged in the intake air duct 15. Steam S with a high temperature (for example, 300° C.) is supplied to the heat exchanger 30 through a steam pipe 31. The heat exchanger 30 heats (performs heat exchange of) air "A" to be taken by the gas turbine 10 utilizing heat of the supplied steam S.

A control valve 32 for controlling an amount of steam caused to flow in the steam pipe 31, namely, an amount of steam supplied to the heat exchanger 30 is arranged in the steam pipe 31.

Incidentally, as steam supplied to the heat exchanger 30, steam generated from an auxiliary steam boiler (not shown), steam generated from an exhaust heat recovery boiler (not shown) which utilizes heat of exhaust gas exhausted from the turbine 13 to generate steam, or the like is used.

Incidentally, the steam generated from the auxiliary boiler is hereinafter called "auxiliary steam", and the steam generated from the exhaust heat recovery boiler is hereinafter called "self-generated steam".

A thermometer 40 is attached to a portion of the intake air duct 15 positioned between the heat exchanger 30 and an inlet stage of the compressor 11. The thermometer 40 measures a temperature of air A' which is heated in the heat exchanger 30 to be taken by the compressor 11 of the gas turbine 10. A measurement temperature t1 of the intake air A' measured in this manner is transmitted to a control apparatus 50.

The control apparatus 50 includes a deviation calculating unit 50a and a proportional-integral calculating unit (a PI calculating unit) 50b. A target temperature T0 (for example, +5° C.) is preliminarily set in the control apparatus 50. The target temperature T0 is a temperature preliminarily set in response to characteristic of each gas turbine 10 as intake air temperature which can combust (operate) the gas turbine 10 stably.

The deviation calculating unit 50a of the control apparatus 50 performs deviation calculation between the measurement temperature t1 and the target temperature T0 to obtain a deviation temperature Δt (=T0−t1). The proportional-integral calculating unit 50b performs PI calculation to the deviation temperature Δt to output a valve opening instruction P. A valve opening of the control valve 32 is adjusted in response to the valve opening instruction P.

Accordingly, when the measurement temperature t1 is low, the valve opening instruction P takes a large value to increase the valve opening of the control valve 32 so that a steam amount supplied to the heat exchanger 30 is increased. On the other hand, when the measurement temperature t1 becomes high, the valve opening instruction P takes a small value to decrease the valve opening of the control valve 32 so that a steam amount supplied to the heat exchanger 30 is decreased. As a result, feedback control is performed to a steam amount supplied to the heat exchanger 30 such that the temperature of air A' heated by the heat exchanger 30 to be taken by the compressor 11 reaches the target temperature T0. Thereby, the temperature of the intake air A' is maintained at a stably combustible temperature.

Incidentally, the present inventor(s), has (have) developed a technique where, when an intake air amount taken by the gas turbine 10 increases/decreases due to opening change of the IGV 11a or the like, the increase/decrease of the intake air amount is detected, a valve opening preceding instruction corresponding to the increase/decrease of the intake air amount is obtained, and a valve opening of the control valve 32 is controlled by an instruction obtained by adding the value opening preceding instruction to a valve opening instruction P and has already filed a patent application about the technique (Japanese Patent Application NO. 2006-313758).

That is, a patent application about an invention of a control apparatus which performs control so as to maintain a temperature of intake air in the target temperature T0 by performing preceding (feedforward) control based upon the valve opening preceding instruction in response to increase/decrease of an intake air amount in addition to feedback control based upon the valve opening instruction P, even if the intake air amount increases/decreases rapidly has been filed by the inventor(s).

Patent Literature 1: JPB-4-48921
Patent Literature 2: JPA-2003-161164

DISCLOSURE OF THE INVENTION

Problem to be Solved by the Invention

In the gas turbine plant shown in FIG. 5, one of auxiliary steam generated in the auxiliary steam boiler and self-generated steam generated in the exhaust heat recovery boiler is selected and supplied to the heat exchanger 30.

Here, switching between steam sources to be supplied to the heat exchanger 30 will be explained specifically.

Switching between steam sources is performed such that, when output of the generator 20 is less than a prescribed value, auxiliary steam is supplied to the heat exchanger 30, and when the output of the generator 20 is equal to or more than the prescribed value, self-generated steam is supplied to the heat exchanger 30.

Therefore, auxiliary steam is first supplied to the heat exchanger 30 for a period of start-up of the gas turbine 10, and switching between steam sources is performed such that, when the output of the generator 20 is equal to or more than the prescribed value, self-generated steam is supplied to the heat exchanger 30 instead of the auxiliary steam.

On the other hand, self-generated steam is originally supplied to the heat exchanger 30 for a period of stopping of the gas turbine 10, but switching is performed such that, when the output of the generator 20 is less than the prescribed value, auxiliary steam is supplied to the heat exchanger 30 instead of the self-generated steam.

Conventionally, however, when steam to be supplied to the heat exchanger 30 is switched from auxiliary steam to self-generated steam, and, on the contrary, when it is switched from self-generated steam to auxiliary steam, fluctuation of the temperature of intake air A' after heated may occur due to a difference in steam conditions (steam temperature, steam pressure, and the like) between auxiliary steam and self-generated steam, but there is not control means for suppressing such fluctuation in a conventional art.

Therefore, when steam to be supplied to the heat exchanger 30 is switched from auxiliary steam to self-generated steam, and, on the contrary, when it is switched from self-generated steam to auxiliary steam, fluctuation of the temperature of intake air A' after heated occurs, so that there is a possibility that stable combustion in the gas turbine 10 cannot be maintained.

In view of the abovementioned conventional art, an object of the present invention is to provide an apparatus for controlling intake air heating of a gas turbine where, even if steam to be supplied to a heat exchanger is switched from auxiliary steam to self-generated steam, and, on the contrary, even if it is switched from self-generated steam to auxiliary steam, the temperature of intake air after heated can be kept constant.

Means for Solving the Problem

A configuration of the present invention for solving the abovementioned problem comprises:

a heat exchanger which is supplied with self-generated steam whose supply amount is controlled in response to a valve opening of a self-generated steam control valve and auxiliary steam whose supply amount is controlled in response to a valve opening of an auxiliary steam control valve to heat air which is taken by a gas turbine utilizing supplied steam;

a thermometer which measures the temperature of air which is heated by the heat exchanger and taken by the gas turbine; and a control apparatus which includes a self-generated steam control unit which feeds a self-generated steam valve opening instruction for causing a measurement temperature measured at the thermometer to reach a preset target temperature to the self-generated steam control valve to control a valve opening of the self-generated steam control valve and an auxiliary steam control unit which feeds an auxiliary steam valve opening instruction for causing the measurement temperature to the target temperature to the auxiliary steam control valve to control a valve opening of the auxiliary steam control valve, wherein when output of a generator rotationally driven by the gas turbine decreases from a value equal to or higher than a predetermined prescribed value to a value less than the prescribed value, the self-generated steam control unit holds a value of the self-generated steam valve opening instruction at a time point when the output reaches the value less than the prescribed value and gradually decreases the value of the self-generated steam valve opening instruction from the held value down to zero in a predetermined set time, while the auxiliary steam control unit controls a valve opening of the auxiliary steam control valve according to an auxiliary steam adjustment valve opening instruction obtained by multiplying the auxiliary steam valve opening instruction by a coefficient whose value gradually changes from 0 to 1 along time elapsing in a predetermined set time from the time point when the output reaches the value less than the prescribed value, when the output of the generator increases from a value less than the preset prescribed value to the prescribed value or higher, the auxiliary steam control unit holds a value of an auxiliary steam valve opening instruction at a time point when the output reaches the prescribed value or higher and gradually decreases the value of the auxiliary steam valve opening instruction from the held value to zero in a predetermined set time, while the self-generated steam control unit controls a valve opening of the self-generated steam control unit according to a self-generated steam adjustment valve opening instruction obtained by multiplying the self-generated steam valve opening instruction by a coefficient whose value gradually changes from 0 to 1 along a time elapsing in a predetermined set time from the time point when the output reaches the prescribed value or higher.

Another configuration of the present invention comprises:

a heat exchanger which is supplied with self-generated steam whose supply amount is controlled in response to a valve opening of a self-generated steam control valve and auxiliary steam whose supply amount is controlled in response to a valve opening of an auxiliary steam control valve to heat air which is taken by a gas turbine utilizing supplied steam;

a thermometer which measures the temperature of air which is heated by the heat exchanger and taken by the gas turbine;

a steam source switching signal generating unit which outputs a first steam source switching signal when output of a generator rotationally driven by the gas turbine decreases from a value equal to or higher than a predetermined prescribed value to a value less than the prescribed value and which outputs a second steam source switching signal when the output of the generator increases from a value less than the predetermined prescribed value to a value equal to or higher than the prescribed value;

a self-generated steam usage coefficient generating unit which outputs a self-generated steam usage coefficient whose value gradually changes from 1 to 0 along time elapsing in a predetermined set time when the first steam source switching signal is outputted and whose value gradually changes from 0 to 1 along time elapsing in a predetermined set time when the second steam source switching signal is outputted;

a self-generated steam control unit which feeds a self-generated steam correction valve opening instruction obtained by adding a self-generated steam valve opening correction instruction for performing feedback control so as to make a deviation between a measurement temperature measured by the thermometer and a preset target temperature zero and a self-generated steam valve opening preceding instruction for performing preceding control such that the measurement temperature reaches the target temperature to the self-generated steam control valve, thereby controlling a valve opening of the self-generated steam control valve; and an auxiliary steam control unit which feeds an auxiliary steam correction valve opening instruction obtained by adding an auxiliary steam valve opening correction instruction for performing feedback control so as to make a deviation between the measurement temperature and the preset target temperature zero and an auxiliary steam valve opening preceding instruction for performing preceding control such that the measurement temperature reaches the target temperature to the auxiliary steam control valve, thereby, controlling a valve opening of the auxiliary steam control valve, wherein when the first steam source switching signal is outputted, the self-generated steam control unit maintains a value of the self-generated steam correction valve opening instruction at a time point when the first steam source switching signal is outputted and gradually decreases the value of the self-generated steam correction value opening instruction from the held value to zero in a predetermined set time, while the auxiliary steam control unit controls a valve opening of the auxiliary steam control valve according to an auxiliary steam adjustment valve opening instruction obtained by multiplying the auxiliary steam correction valve opening instruction by a difference value obtained from subtracting the self-generating steam usage coefficient from a value of 1, and when the second steam source switching signal is outputted, the auxiliary steam control unit maintains a value of the auxiliary steam correction value opening instruction at a time point when the second steam source switching signal is outputted and gradually decreases the value of the auxiliary steam correction value opening instruction from the held value to 0 in a predetermined set time, while the self-generated steam control unit controls a valve opening of the self-generated steam control valve according to a self-generated steam adjustment valve opening instruction obtained by multiplying the self-generated steam correction valve opening instruction by the self-generated steam usage coefficient.

In still another configuration of the present invention, the self-generated steam control unit comprises:

a deviation calculating unit for self-generated steam which obtains a deviation temperature for self-generated steam which is the deviation between the target temperature and the measurement temperature;

a proportional-integral calculating unit for self-generated steam which performs proportional-integral calculation of the deviation temperature for self-generated steam to obtain a valve opening correction instruction for self-generated steam;

a second deviation calculating unit for self-generated steam which obtains a temperature difference between the target temperature and an atmospheric temperature;

a valve opening instruction calculation function unit for self-generated steam which outputs a valve opening instruction for self-generated steam whose value becomes large when a rotation number of the gas turbine increases;

an inlet guide vane correction coefficient calculation function unit for self-generated steam which outputs an inlet guide vane correction coefficient for self-generated steam whose coefficient value becomes large when an opening of an inlet guide vane of the gas turbine increases;

a temperature difference correction coefficient calculation function unit for self-generated steam which outputs a temperature difference correction coefficient for self-generated steam whose coefficient value becomes large when the temperature difference increases;

a steam pressure correction coefficient calculation function unit for self-generated steam which outputs a steam pressure correction coefficient for self-generated steam whose coefficient value becomes 1 when a pressure of self-generated steam supplied to the heat exchanger is equal to a predetermined reference pressure, whose coefficient value becomes smaller than 1 when the pressure becomes larger than the reference pressure, and whose coefficient value becomes larger than 1 when the pressure becomes smaller than the reference pressure;

a steam temperature correction coefficient calculation function unit for self-generated steam which outputs a steam temperature correction coefficient for self-generated steam whose coefficient value becomes 1 when a temperature of self-generated steam supplied to the heat exchanger is equal to a predetermined reference temperature, whose coefficient value becomes smaller than 1 when the temperature becomes larger than the reference temperature, and whose coefficient value becomes larger than 1 when the temperature becomes smaller than the reference temperature;

a multiplying unit for self-generated steam which performs multiplication of the valve opening instruction for self-generated steam, the input guide vane correction coefficient for self-generated steam, the temperature difference correction coefficient for self-generated steam, the steam pressure correction coefficient for self-generated steam, and the steam temperature correction coefficient for self-generated steam to output a valve opening preceding instruction for self-generated steam; and an adding unit for self-generated steam which adds the valve opening correction instruction for self-generated steam and the valve opening preceding instruction for self-generated steam to output a correction valve opening instruction for self-generated steam, and the auxiliary steam control unit comprises:

a deviation calculating unit for auxiliary steam which obtains a deviation temperature for auxiliary steam which is the deviation between the target temperature and the measurement temperature;

a proportional-integral calculating unit for auxiliary steam which performs proportional-integral calculation of the deviation temperature for auxiliary steam to obtain a valve opening correction instruction for auxiliary steam;

a second deviation calculating unit for auxiliary steam which obtains a temperature difference between the target temperature and an atmospheric temperature;

a valve opening instruction calculation function unit for auxiliary steam which outputs a valve opening instruction for auxiliary steam whose value becomes large when the rotation number of the gas turbine increases;

an inlet guide vane correction coefficient calculation function unit for auxiliary steam which outputs an inlet guide vane correction coefficient for auxiliary steam whose coefficient value becomes large when the opening of the inlet guide vane of the gas turbine increases;

a correction coefficient calculation function unit for auxiliary steam temperature difference which outputs a temperature difference correction coefficient for auxiliary steam whose coefficient value becomes large when the temperature difference becomes large;

a steam pressure correction coefficient calculation function unit for auxiliary steam which outputs a steam pressure correction coefficient for auxiliary steam whose coefficient value becomes 1 when a pressure of auxiliary steam supplied to the heat exchanger is equal to a predetermined reference pressure, whose coefficient value becomes smaller than 1 when the pressure becomes larger than the reference pressure, and whose coefficient value becomes larger than 1 when the pressure becomes smaller than the reference pressure;

a steam temperature correction coefficient calculation function unit for auxiliary steam which outputs a steam temperature correction coefficient for auxiliary steam whose coefficient value becomes 1 when a temperature of auxiliary steam supplied to the heat exchanger is equal to a predetermined reference temperature, whose coefficient value becomes smaller than 1 when the temperature becomes larger than the reference temperature, and whose coefficient value becomes larger than 1 when the temperature becomes smaller than the reference temperature;

a multiplying unit for auxiliary steam which performs multiplication of the valve opening instruction for auxiliary steam, the inlet guide vane correction coefficient for auxiliary steam, the temperature difference correction coefficient for auxiliary steam, the steam pressure correction coefficient for auxiliary steam, and the steam temperature correction coefficient for auxiliary steam to output a valve opening preceding instruction for auxiliary steam; and an adding unit for auxiliary steam which adds the valve opening correction instruction for auxiliary steam and the valve opening preceding instruction for auxiliary steam to output a correction valve opening instruction for auxiliary steam.

Effect of the Invention

According to the present invention, when steam supplied to the heat exchanger at a start-up time of the gas turbine is switched from auxiliary steam to self-generated steam, the auxiliary steam control valve for controlling a supply amount of auxiliary steam is throttled at a constant rate and, while an opening of the self-generated steam control valve for controlling a supply amount of self-generated steam is being controlled such that a temperature of heated air reaches the target temperature, a rate of the opening is increased.

That is, at the start-up time, the auxiliary steam control valve is throttled at a constant rate and the self-generated steam control valve is opened while opening control is being performed to the self-generated steam control valve.

When steam supplied to the heat exchanger at a stopping time of the gas turbine is switched from self-generated steam to auxiliary steam, the self-generated steam control valve for controlling a supply amount of self-generated steam is throttled at a constant rate and, while the opening of the auxiliary steam control valve for controlling a supply amount of auxiliary steam is being controlled such that a temperature of heated air reaches the target temperature, a rate of the opening is increased.

That is, at the stopping time, the self-generated steam control valve is throttled at a constant rate and the auxiliary steam control valve is opened while opening control is being performed to the auxiliary steam control valve.

Since such a configuration is adopted in this manner such that, in case that, while one of the self-generated steam control valve and the auxiliary steam control valve is throttled, the other is opened, the one is throttled at a constant rate and the other is opened while an opening of the other is controlled, a temperature of air to be heated can be maintained at a target temperature stably even if steam supplied to the heat exchanger is switched between self-generated steam and auxiliary steam.

BRIEF DESCRIPTION OF THE DRAWINGS

FIG. 4 is a characteristic diagram showing an operating state of the embodiment; and FIG. 5 is a block configuration diagram showing a conventional art.

EXPLANATION OF REFERENCE NUMERALS

Figure 1:
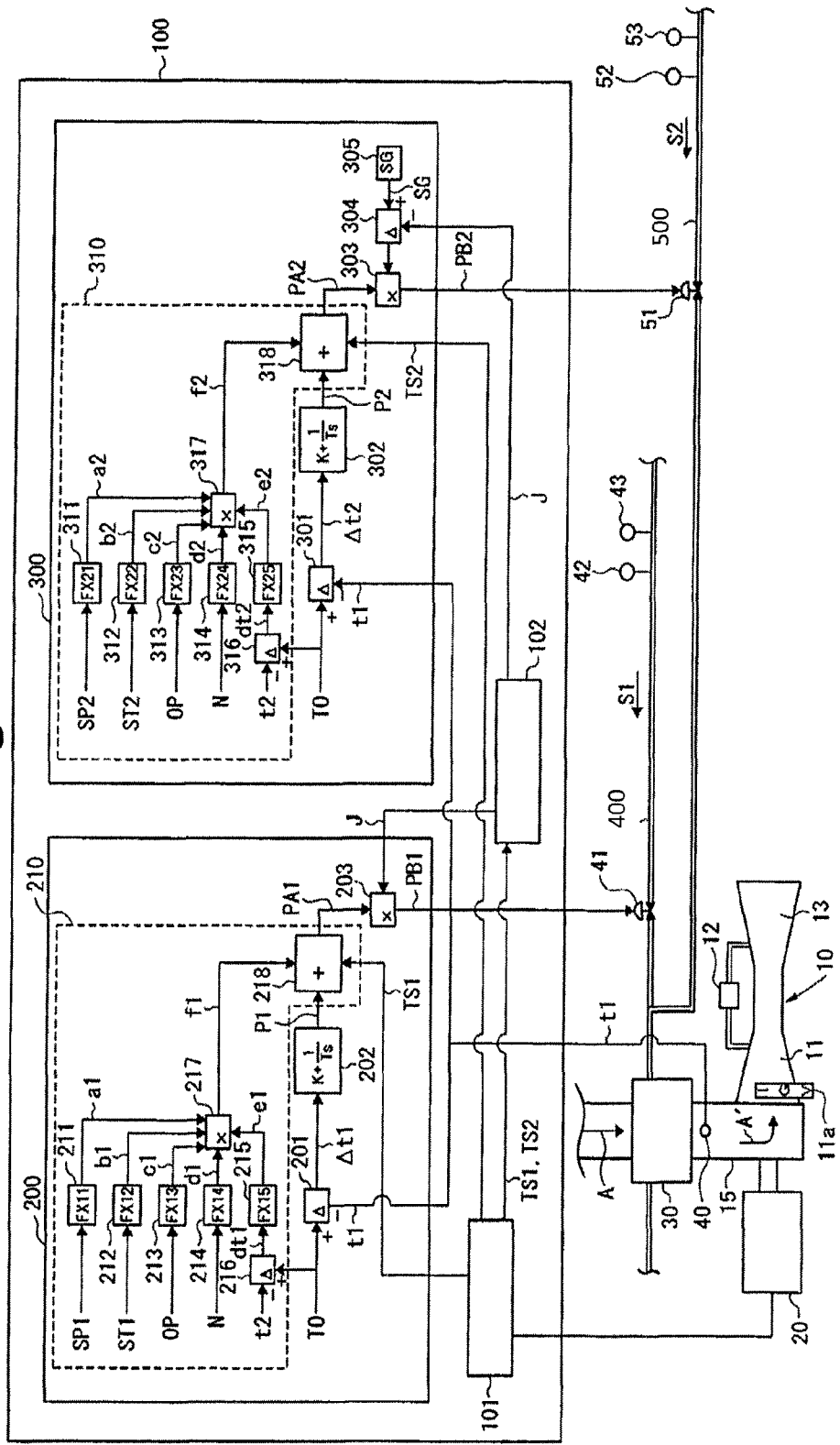
FIG. 1 is a block configuration diagram showing a gas turbine plant to which an apparatus for controlling intake air heating of a gas turbine according to an embodiment of the present invention has been applied.

10: gas turbine
11a: inlet guide vane
15: intake air duct
30: heat exchanger
400: self-generated steam pipe
41: self-generated steam control valve
500: auxiliary steam pipe
51: auxiliary steam control valve
100: control apparatus
101: steam source switching signal generating unit
102: self-generated steam usage coefficient generating unit
200: self-generated steam control unit
210: self-generated steam preceding control unit 300: auxiliary steam control unit
310: auxiliary steam preceding control unit
A, A': air
S1: self-generated steam
S2: auxiliary steam
TS1, TS2: steam source switching signal
J: self-generated steam usage coefficient

BEST MODE FOR CARRYING OUT THE INVENTION

A best mode for carrying out the invention will be explained in detail below with reference to an embodiment.

Embodiment

Whole Configuration of Gas Turbine Plant

FIG. 1 shows a gas turbine plant to which an apparatus for controlling intake air heating of a gas turbine according to an embodiment of the present invention has been applied. As shown in FIG. 1, a gas turbine 10 comprises a compressor 11, a combustor 12, and a turbine 13 as main components. Air (atmosphere) "A" taken from the outside is taken by the compressor 11 of the gas turbine 10 via an intake air duct 15.

An inlet of the compressor 11 is provided with an inlet guide vane (IGV) 11a, and an amount of air taken by the compressor 11 is controlled by an opening of the IGV 11a. Incidentally, the opening of the IGV 11a is controlled according to a load state, an operating state, or the like.

A generator 20 is coupled to the gas turbine 10 to be rotationally driven by the gas turbine 10, thereby generating electric power.

A heat exchanger 30 for intake air heating is arranged in the intake air duct 15. The heat exchanger 30 is supplied with self-generated steam S1 via a self-generated steam pipe 400 and is supplied with auxiliary steam S2 via an auxiliary steam pipe 500. The heat exchanger 30 heats (performs heat exchange of) air "A" to be taken by the gas turbine 10 utilizing heat of supplied steam S (self-generated steam S1 and auxiliary steam S2 are generically called "steam S").

The self-generated steam pipe 400 includes a self-generated steam control valve 41 provided in an interposing manner, and it is further provided with a pressure gauge 42 detecting a pressure of self-generated steam S1 and a thermometer 43 detecting a temperature of self-generated steam S1.

By adjusting a valve opening of the self-generated steam control valve 41, an amount of self-generated steam S1 supplied to the heat exchanger 30 is controlled. Opening control of the self-generated steam control valve 41 is performed by a self-generated steam control unit 200 in a control apparatus 100 described later.

A self-generated steam pressure SP1 detected by the pressure gauge 42 and a self-generated steam temperature ST1 detected by the thermometer 43 are fed to a self-generated steam preceding control unit 210 (specifically, correction coefficient calculation function units 211 and 212) in the control apparatus 100 described later.

The auxiliary steam pipe 500 includes an auxiliary steam control valve 51 provided in an interposing manner and it is further provided with a pressure gauge 52 detecting a pressure of auxiliary steam S2 and a thermometer 53 detecting a temperature of auxiliary steam S2.

By adjusting a valve opening of the auxiliary steam control valve 51, an amount of auxiliary steam S2 supplied to the heat exchanger 30 is controlled. Opening control of the auxiliary steam control valve 51 is performed by an auxiliary steam control unit 300 in the control apparatus 100 described later.

An auxiliary steam pressure SP2 detected by the pressure gauge 52 and an auxiliary steam temperature ST2 detected by the thermometer 53 are fed to an auxiliary steam preceding control unit 310 (specifically, correction coefficient calculation function units 311, 312) in the control apparatus 100 described later.

A thermometer 40 is attached at a portion in the intake air duct 15 positioned between the heat exchanger 30 and an inlet stage of the compressor 11. The temperature 40 measures a temperature of air A' which is heated by the heat exchanger 30 to be taken by the compressor 11 of the gas turbine 10. A measurement temperature t1 of the intake air A' measured in this manner is fed to the control apparatus 100 (specifically, deviation calculating units 201 and 301) described later.

<Whole Configuration of Control Apparatus>

The control apparatus 100 includes a steam source switching signal generating unit 101, a self-generated steam usage coefficient generating unit 102, the self-generated steam control unit 200, and the auxiliary steam control unit 300.

Though described in detail later, the steam source switching signal generating unit 101 and the self-generated steam usage coefficient generating unit 102 are functional blocks operating such that, when switching between steam sources is performed, the switching is performed smoothly.

The steam source switching signal generating unit 101 detects output of the generator 20, and outputs a steam source switching signal TS1 which is an instruction signal for performing switching from self-generated steam S1 to auxiliary steam S2 when the generator output decreases from a value equal to or more than a prescribed value (for example, 50% of a rated output) to a value less than the prescribed value. The steam source switching signal TS1 is fed to the self-generated steam control unit 200 (specifically, an adding unit 218) and the self-generated steam usage coefficient generating unit 102.

The steam source switching signal generating unit 101 detects output of the generator 20 and outputs a steam source switching signal TS2 which is an instruction signal for performing switching from auxiliary steam S2 to self-generated steam S1 when the generator output increases from a value less than the prescribed value (for example, 50% of the rated output) to a value equal to or more than the prescribed value. The steam source switching signal ST2 is fed to the auxiliary steam control unit 300 (specifically, an adding unit 318) and the self-generated steam usage coefficient generating unit 102.

The self-generated steam usage coefficient generating unit 102 feeds a self-generated steam usage coefficient J to the self-generated steam control unit 200 (specifically, an output adjusting unit 203) and the auxiliary steam control unit 300 (specifically, an a deviation calculation unit 304). A value of the self-generated steam usage coefficient J varies in the following manner (see FIG. 4B). (1) When a steam switching signal ST1 is inputted into the self-generated steam usage coefficient generating unit 102, the value of the self-generated steam usage coefficient J gradually decreases from "1" to "0" in a predetermined set time and it holds "0" after predetermined time elapsing (a term from γ to δ in FIG. 4B). (2) When a steam switching signal TS2 is inputted into the self-generated steam usage coefficient generating unit 102, the value of the self-generated steam usage coefficient J gradually increases from "0" to "1" in a predetermined set time and it holds "1" after predetermined time elapsing (a term from α to β in FIG. 4B).

<Configuration and Basic Operation of Self-Generated Steam Control Unit>

The self-generated steam control unit 200 includes the deviation calculating unit 201 and the proportional-integral calculating unit 202, the output adjusting unit 203, and the self-generated steam preceding control unit 210.

A target temperature TO (for example, +5° C.) is preliminarily set in the self-generated steam control unit 200. The target temperature TO is a temperature preliminarily set according to characteristics of each gas turbine 10 as an intake air temperature at which stable combustion (operation) can be performed in the gas turbine 10.

The deviation calculating unit 201 calculates a deviation between a measurement temperature t1 and the target temperature TO to obtain a deviation temperature $\Delta t1$ ($=$TO$-$t1). The proportional-integral calculating unit 202 performs PI calculation to the deviation temperature $\Delta t1$ to output a valve opening correction instruction P1.

The self-generated steam preceding control unit 210 includes correction coefficient calculation function units 211 to 213 and 215, a valve opening instruction calculation function unit 214, a deviation calculating unit 216, a multiplying unit 217, and an adding unit 218.

The correction coefficient calculation function unit 211 is inputted with a self steam pressure SP1 indicating a pressure of self-generated steam S1 measured by the pressure gauge 42, and the correction coefficient calculation function unit 212 is inputted with a self-generated steam temperature ST1 indicating a temperature of self-generated steam S1 measured by the thermometer 43.

The correction coefficient calculation function unit 213 is inputted with an IGV opening OP measured by a sensor (not shown) detecting an opening of the IGV 11a, and the valve opening instruction function calculating unit 214 is inputted with a gas turbine rotation number N measured by a sensor (not shown) detecting a rotation number of the gas turbine 10.

The deviation calculating unit 216 is inputted with an atmosphere temperature t2 measured by a sensor (not shown) detecting a temperature of the atmosphere and the target temperature TO. The deviation calculating unit 216 performs deviation calculation between the atmosphere temperature t2 and the target temperature TO to obtain a temperature difference dt1 ($=$TO$-$t2).

Figure 2A:
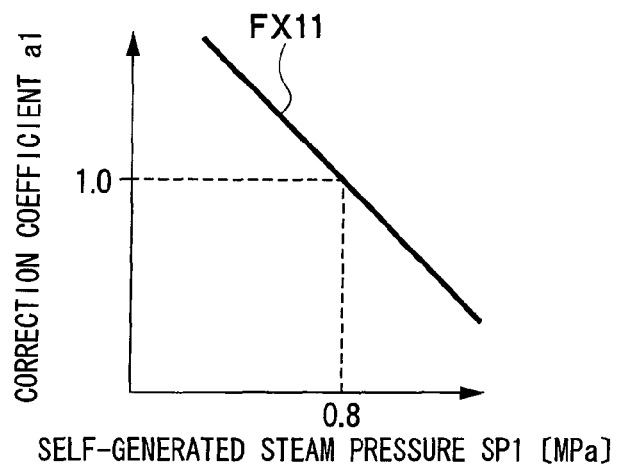
FIG. 2A is a characteristic diagram showing a function characteristic FX11 used in a self-generated steam control unit according to the embodiment.

The correction coefficient calculation function unit 211 includes a correction coefficient calculation function FX11 such as shown in FIG. 2A, and when the coefficient calculation function unit 211 is inputted with a self-generated steam pressure SP1, it outputs a correction coefficient a1 corresponding to the inputted self-generated steam pressure SP1 using the correction coefficient calculation function unit FX11.

The correction coefficient calculation function FX11 includes function characteristic where the correction coefficient a1 decreases according to increase of the self-generated steam pressure SP1, where, for example, when the self-generated steam pressure SP1 is a standard pressure (for example, 0.8 MPa), the correction coefficient calculation function unit 211 outputs the correction coefficient a1 whose value is 1, when the self-generated steam pressure SP1 becomes less than the standard pressure, the correction coefficient calculation function unit 211 outputs the correction coefficient a1 whose value is larger than 1, and when the self-generated steam pressure SP1 becomes larger than the standard pressure, the correction coefficient calculation function unit 211 outputs the correction coefficient a1 whose value is smaller than 1.

Figure 2B:
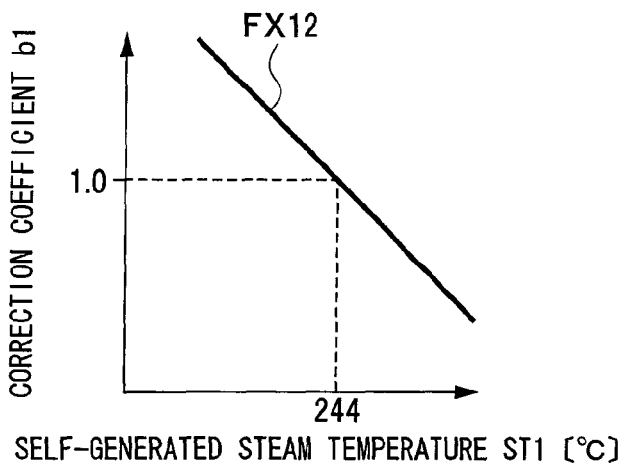
FIG. 2B is a characteristic diagram showing a function characteristic FX12 used in the self-generated steam control unit according to the embodiment.

The correction coefficient calculation function unit 212 includes a correction coefficient calculation function FX12 such as shown in FIG. 2B, and when the correction coefficient calculation function unit 212 is inputted with a self-generated steam temperature ST1, it outputs a correction coefficient b1 corresponding to the inputted self-generated steam ST1 using the correction coefficient calculation function FX12.

The correction coefficient calculation function FX12 includes function characteristic where the correction coefficient b1 decreases according to increase of the self-generated steam pressure ST1, where, for example, when the self-generated steam temperature ST1 is a standard temperature (for example, 244° C.), the correction coefficient calculation function unit 212 outputs the correction coefficient b1 whose value is 1, when the self-generated steam temperature ST1 becomes smaller than the standard temperature, the correction coefficient calculation function unit 212 outputs the correction coefficient b1 whose value is larger than 1, and when the self-generated steam temperature ST1 becomes larger than the standard temperature, the correction coefficient calculation function unit 212 outputs the correction coefficient b1 whose value is smaller than 1.

Figure 2C:
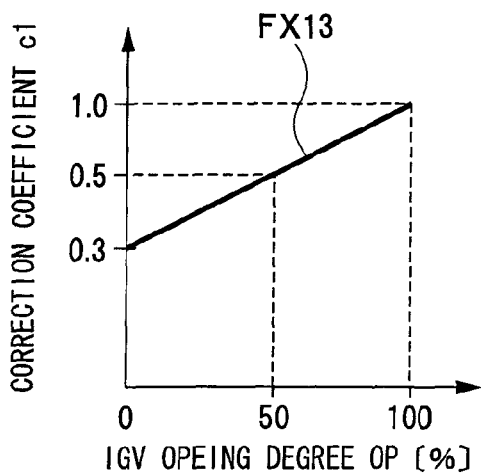
FIG. 2C is a characteristic diagram showing a function characteristic FX13 used in the self-generated steam control unit according to the embodiment.

The correction coefficient calculation function unit 213 includes a correction coefficient calculation function FX13 such as shown in FIG. 2C, and when the correction coefficient calculation function unit 213 is inputted with an IGV opening OP, it outputs a correction coefficient c1 corresponding to the inputted IGV opening OP using the correction coefficient calculation function FX13.

The correction coefficient calculation function FX13 includes function characteristic where the correction coefficient c1 increases according to increase of the IGV opening OP, where, for example, when the IGV opening OP is 0%, the correction coefficient calculation function unit 213 outputs the correction coefficient c1 whose value is 0.3, when the IGV opening OP is 50%, the correction coefficient calculation function unit 213 outputs the correction coefficient c1 whose value is 0.5, and when the IGV opening OP is 100%, the correction coefficient calculation function unit 213 outputs the correction coefficient c1 whose value is 1.0.

Figure 2D:
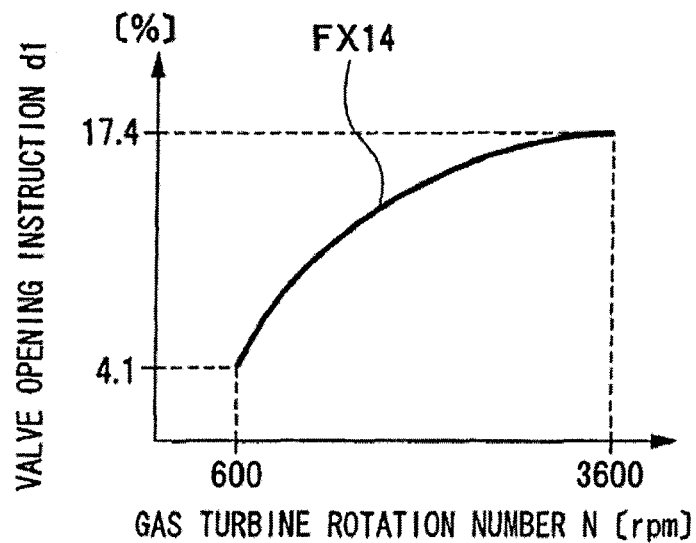
FIG. 2D is a characteristic diagram showing a function characteristic FX14 used in the self-generated steam control unit according to the embodiment.

The valve opening instruction calculation function unit 214 includes a valve opening instruction operation function FX14 such as shown in FIG. 2D, and when the valve opening instruction calculation function unit 214 is inputted with a gas turbine rotation number N, it outputs a proper valve opening instruction d1 corresponding to the inputted gas turbine rotation number N using the valve opening instruction operation function FX14.

The valve opening instruction operation function FX14 includes function characteristic where a valve opening instruction d1 gradually increases according to increase of the gas turbine rotation number N, where, for example, when the gas turbine rotation number N is 600 rpm, the valve opening instruction calculation function unit 214 outputs the valve opening instruction d1 whose value is 4.1%, and when the gas turbine rotation number N is 3600 rpm, the valve opening instruction calculation function unit 214 outputs the valve opening instruction d1 whose value is 17.4%.

Figure 2E:
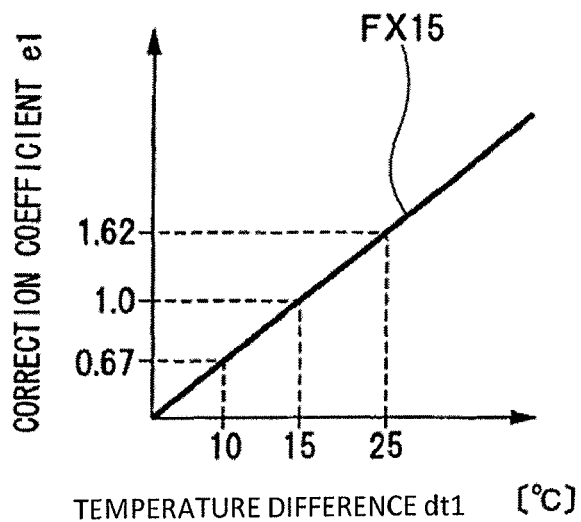
FIG. 2E is a characteristic diagram showing a function characteristic FX15 used in the self-generated steam control unit according to the embodiment.

The correction coefficient calculation function unit 215 includes a correction coefficient calculation function FX15 such as shown in FIG. 2E, and when the correction coefficient calculation function unit 215 is inputted with a temperature difference dt1, it outputs a correction coefficient e1 corresponding to the input temperature difference dt1 using the correction coefficient calculation function FX15.

The correction coefficient calculation function FX15 includes function characteristic where the correction coefficient e1 increases according to increase of the temperature difference dt1, where, for example, when the temperature difference dt1 is 10° C., the correction coefficient calculation function unit 215 outputs the correction coefficient e1 whose value is 0.67, when the temperature difference is 15° C., the correction coefficient calculation function unit 215 outputs the correction coefficient e1 whose value is 1.0, and when the temperature difference dt1 is 25° C., the correction coefficient calculation function unit 215 outputs the correction coefficient e1 whose value is 1.62.

The multiplying unit 217 multiplies the valve opening instruction d1 by all the correction coefficients a1, b1, c1, and e1 to output a valve opening preceding instruction f1. Further, the adding unit 218 adds the valve opening preceding instruction f1 to the valve opening correction instruction P1 outputted from the proportional-integral calculating unit 202 to output a correction valve opening instruction PA1.

Incidentally, when the adding unit 218 is inputted with a steam source switching signal TS1, it tracks (holds) a value of the correction valve opening instruction PA1 at a time point of input of the steam source switching signal TS1 to continue to output the correction valve opening instruction PA1 which is the tracked value.

The output adjusting unit 203 multiplies the correction valve opening instruction PA1 by a self-generated steam usage coefficient J (whose value is in a range from "0" to "1") to output an adjustment valve opening instruction PB1.

Though described in detail later, the output adjusting unit 203 is a functional block operating such that switching between steam sources is performed smoothly when the switching is performed.

<Configuration and Basic Operation of Auxiliary Steam Control Unit>

The auxiliary steam control unit 300 includes a deviation calculating unit 301, a proportional-integral calculating unit 302, an output adjusting unit 303, a deviation calculating unit 304, a signal generating unit 305, and an auxiliary steam preceding control unit 310.

A target temperature TO (for example, +5° C.) is preliminarily set in the auxiliary steam control unit 300. The target temperature TO is a temperature preliminarily set according to characteristics of each gas turbine 10 as an intake air temperature at which stable combustion (operation) can be performed in the gas turbine 10.

The deviation calculating unit 301 performs deviation calculation between the measurement temperature t1 and the target temperature TO to obtain a deviation temperature Δt2 (=TO−t1). The proportional-integral calculating unit 302 performs PI calculation of the deviation temperature Δt2 to output a valve opening correction instruction P2.

The auxiliary steam preceding control unit 310 includes correction coefficient calculation function units 311 to 313 and 315, a valve opening instruction calculation function unit 314, a deviation calculating unit 316, a multiplying unit 317, and an adding unit 318.

The correction coefficient calculation function unit 311 is inputted with an auxiliary steam pressure SP2 indicating a pressure of auxiliary steam S2 measured by the pressure gauge 52 and the correction coefficient calculation function unit 312 is inputted with an auxiliary steam temperature ST2 indicating a temperature of auxiliary steam S2 measured by the thermometer 53.

The correction coefficient calculation function unit 313 is inputted with an IGV opening OP measured by a sensor (not shown) detecting an opening of the IGV 11a and the valve opening instruction calculation function unit 314 is inputted with a gas turbine rotation number N measured by a sensor (not shown) detecting a rotation number of the gas turbine 10.

The deviation calculating unit 316 is inputted with an atmospheric temperature t2 measured by a sensor (not shown) detecting a temperature of the atmosphere and the target temperature TO. The deviation calculating unit 316 performs deviation calculation between the atmospheric temperature t2 and the target temperature TO to obtain a temperature difference dt2 (=TO−t2).

Figure 3A:
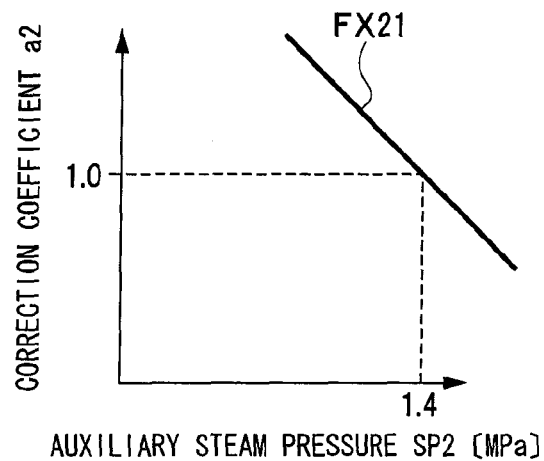
FIG. 3A is a characteristic diagram showing a function characteristic FX21 used in an auxiliary steam control unit according to the embodiment.

The correction coefficient calculation function unit 311 includes a correction coefficient calculation function FX21 such as shown in FIG. 3A and when the correction coefficient calculation function unit 311 is inputted with an auxiliary steam pressure SP2, it outputs a correction coefficient a2 corresponding to the inputted auxiliary steam pressure SP2 using the correction coefficient calculation function FX21.

The correction coefficient calculation function FX21 includes function characteristic where the correction coefficient a2 decreases according to increase of the auxiliary steam pressure SP2, where, for example, when the auxiliary steam pressure SP2 is a standard pressure (for example, 1.4 MPa), the correction coefficient calculation function unit 311 outputs the correction coefficient a2 whose value is 1, when the auxiliary steam pressure SP2 becomes smaller than the standard pressure, the correction coefficient calculation function unit 311 outputs the correction coefficient a2 whose value is larger than 1, and when the auxiliary steam pressure SP2 becomes larger than the standard pressure, the correction coefficient calculation function unit 311 outputs the correction coefficient a2 whose value is smaller than 1.

Figure 3B:
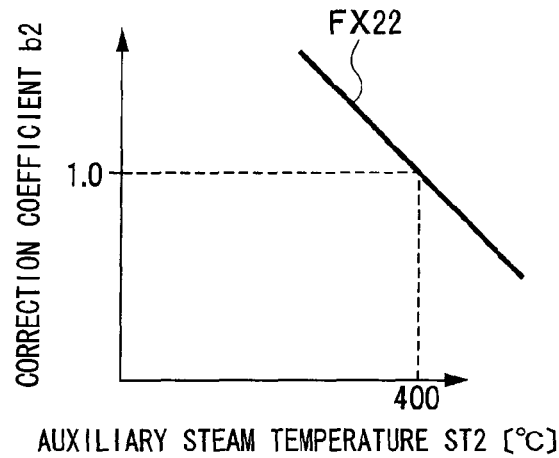
FIG. 3B is a characteristic diagram showing a function characteristic FX22 used in the auxiliary steam control unit according to the embodiment.

The correction coefficient calculation function unit 312 includes a correction coefficient calculation function FX22 such as shown in FIG. 3B and when the correction coefficient calculation function unit 312 is inputted with the auxiliary steam temperature ST2, it outputs a correction coefficient b2 corresponding to the inputted auxiliary steam temperature ST2 using the correction coefficient calculation function FX22.

The correction coefficient calculation function FX22 includes function characteristic where the correction coefficient b2 decreases according to increase of the auxiliary steam temperature ST2, where, for example, when the auxiliary steam temperature ST2 is a standard temperature (for example, 400° C.), the correction coefficient calculation function unit 312 outputs the correction coefficient b2 whose value is 1, when the auxiliary steam temperature ST2 becomes smaller than the standard temperature, the correction coefficient calculation function unit 312 outputs the correction coefficient b2 whose value is larger than 1, and when the auxiliary steam temperature ST2 becomes larger than the standard temperature, the correction coefficient calculation function unit 312 outputs a correction coefficient b2 whose value is smaller than 1.

Figure 3C:
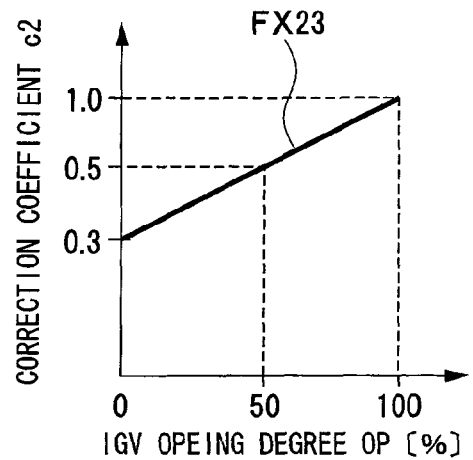
FIG. 3C is a characteristic diagram showing a function characteristic FX23 used in the auxiliary steam control unit according to the embodiment.

The correction coefficient calculation function unit 313 includes a correction coefficient calculation function FX23 such as shown in FIG. 3C and when the correction coefficient calculation function unit 313 is inputted with an IGV opening OP, it outputs a correction coefficient c2 corresponding to the inputted IGV opening OP using the correction coefficient calculation function FX23.

The correction coefficient calculation function FX23 includes function characteristic where the correction coefficient c2 increases according to increase of the IGV opening OP, where, for example, when the IGV opening OP is 0%, the correction coefficient calculation function unit 313 outputs the correction coefficient c2 whose value is 0.3, when the IGV opening OP is 50%, the correction coefficient calculation function unit 313 outputs the correction coefficient c2 whose value is 0.5, and when the IGV opening OP is 100%, the correction coefficient calculation function unit 313 outputs the correction coefficient c2 whose value is 1.0.

Figure 3D:
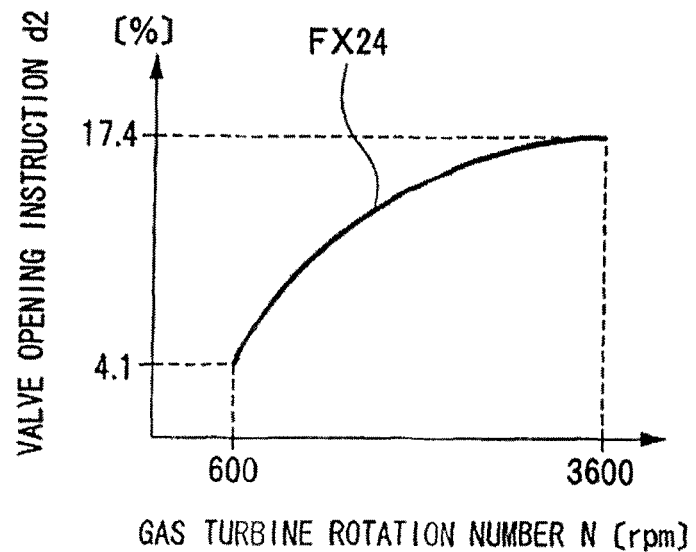
FIG. 3D is a characteristic diagram showing a function characteristic FX24 used in the auxiliary steam control unit according to the embodiment.

The valve opening instruction calculation function unit 314 includes a valve opening instruction calculation function FX24 such as shown in FIG. 3D, and when the valve opening instruction calculation function unit 314 is inputted with a gas turbine rotation number N, it outputs a proper valve opening instruction d2 corresponding to the inputted gas turbine rotation number N using the valve opening instruction calculation function FX24.

The valve opening instruction calculation function FX24 includes function characteristic where the valve opening instruction d2 gradually increases according to increase of the gas turbine rotation number N, where, for example, when the inputted gas turbine rotation number N is 600 rpm, the valve opening instruction calculation function unit 314 outputs a valve opening instruction d2 whose value is 4.1, and when the inputted gas turbine rotation number N is 3600 rpm, the valve opening instruction calculation function unit 314 outputs the valve opening instruction d2 whose value is 17.4%.

Figure 3E:
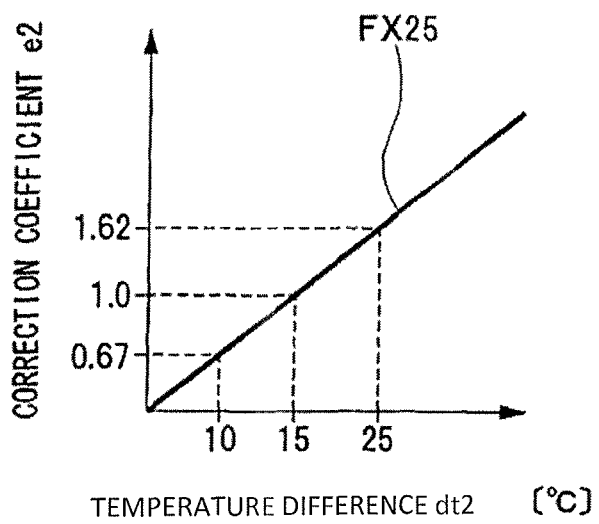
FIG. 3E is a characteristic diagram showing a function characteristic FX25 used in the auxiliary steam control unit according to the embodiment.

The correction coefficient calculation function unit 315 includes a correction coefficient calculation function FX25 such as shown in FIG. 3E, and when the correction coefficient calculation function unit 315 is inputted with a temperature difference dt2, it outputs a correction coefficient e2 corresponding to the inputted temperature difference dt2 using the correction coefficient calculation function FX25.

The correction coefficient calculation function FX25 includes function characteristic where the correction coefficient e2 increases according to increase of the temperature difference dt2, where, for example, when the temperature difference dt2 is 10° C., the correction coefficient calculation function unit 315 outputs the correction coefficient e2 whose value is 0.67, when the temperature difference dt2 is 15° C., the correction coefficient calculation function unit 315 outputs a correction coefficient e2 whose value is 1.0, and when the temperature difference dt2 is 25° C., the correction coefficient calculation function unit 315 outputs a correction coefficient e2 whose value is 1.62.

The multiplying unit 317 multiplies the valve opening instruction d2 by all the correction coefficients a2, b2, c2, and e2 to output a valve opening preceding instruction f2. Further, the adding unit 318 adds the valve opening preceding instruction f2 to the valve opening correction instruction P2 outputted from the proportional-integral calculating unit 302 to output a correction valve opening instruction PA2.

Incidentally, when the adding unit 318 is inputted with a steam source switching signal TS2, it tracks (holds) a value of the valve opening correction instruction P2 at a time point of input of the steam source switching signal TS2 and it continues to output a correction valve opening instruction PA2 which is a tracked value.

The signal generating unit 305 generates a unit signal SG whose value is "1" and the deviation calculating unit 304 outputs a difference value (1−J) obtained by subtracting the self-generated steam usage coefficient J from the unit signal SG.

The output adjusting unit 303 multiplies the correction valve opening instruction PA2 by the difference value (1−J) to output an adjustment valve opening instruction PB2.

Though described in detail later, the output adjusting unit 303 is a functional block which operates such that switching between steam sources is performed smoothly when the switching is performed.

<Control Operation of Auxiliary Steam Control Unit when Generator Output is Less than a Prescribed Value>

Here, in a case that output of the generator 20 becomes less than a prescribed value (for example, 50% of a rated output) and a value of the self-generated steam usage coefficient J outputted from the self-generated steam usage coefficient generating unit 102 is "0", control operation where opening adjustment of the auxiliary steam control valve 51 is performed by the auxiliary steam control unit 300 will be explained.

Incidentally, since the value of the self-generated steam usage coefficient J is "0" at this time, the adjustment valve opening instruction PB1 outputted from the self-generated steam control unit 200 becomes "0" so that the self-generated steam control valve 41 is put in a fully closed state and only the auxiliary steam S2 is supplied to the heat exchanger 30.

Because of J=0, the difference value (1−J) outputted from the deviation calculating unit 304 becomes 1, so that the value of the correction valve opening instruction PA2 and the value of the adjustment valve opening instruction PB2 becomes equal to each other.

When the measurement temperature t1 is low, the valve opening correction instruction P2 and the correction valve opening instruction PA2, therefore, the adjustment valve opening instruction PB2 become large, so that the valve opening of the auxiliary steam control valve 51 becomes large, which results in increase of a steam amount supplied to the heat exchanger 30.

On the other hand, when the measurement temperature t1 becomes high, the valve opening correction instruction P2 and the correction valve opening instruction PA2, therefore, the adjustment valve opening instruction PB2 become small, so that the valve opening of the auxiliary steam control valve 51 becomes small, which results in decrease of a steam amount supplied to the heat exchanger 30.

This control is a control operation similar to a conventional feedback control.

Such a preceding control (a feedforward control) is performed that, when the gas turbine rotation number N increases, the valve opening instruction d2 and the valve opening forward instruction f2 increase according to the increase of the gas turbine rotation number N, and the correction valve opening instruction PA2, therefore, the adjustment valve opening instruction PB2 also increases according to the increase of the gas turbine rotation number N, and the opening of the auxiliary steam control valve 51 increases, so that a steam amount supplied to the heat exchanger 30 increases according to the increase of the gas turbine rotation number N.

On the contrary, such a preceding control (a feedforward control) is performed that, when the gas turbine rotation number N decreases, the valve opening instruction d2 and the valve opening preceding instruction f2 decrease according to the decrease of the gas turbine rotation number N, and the correction valve opening instruction PA2, therefore, the adjustment valve opening instruction PB2 also decreases according to the decrease of the gas turbine rotation number N and the opening of the auxiliary steam control valve 51 decreases, so that a steam amount supplied to the heat exchanger 30 decreases according to the decrease of the gas turbine rotation number N.

Since the preceding control where the opening of the auxiliary steam control valve 51 is increased in a preceding manner according to the increase of the gas turbine rotation number N to increase a steam amount to be supplied to the heat exchanger 30 is performed in this manner, even if an intake air amount increases according to the increase of the rotation number of the gas turbine 10, the temperature of the intake air A' can be maintained at a stably combustible temperature.

Since the preceding control where the opening of the auxiliary steam control valve 51 is decreased in a preceding manner according to the decrease of the gas turbine rotation number N to decrease a steam amount to be supplied to the heat exchanger 30 is performed in this manner, even if an intake air amount decreases according to the decrease of the rotation number of the gas turbine 10, the temperature of the intake air A' can be maintained at a stably combustible temperature.

Such a preceding control (feedforward control) is performed that, when the IGV opening OP increases, the correction coefficient c2 and the valve opening preceding instruction f2 become large according to the increase of the IGV opening OP, and the correction valve opening instruction PA2, therefore, the adjustment valve opening instruction PB2 also becomes large according to the increase of the IGV opening OP, and the valve opening of the auxiliary steam control valve 51 becomes large, so that a steam amount supplied to the heat exchanger 30 increases according to the increase of the IGV opening OP.

On the contrary, such a preceding control (feedforward control) is performed that, when the IGV opening OP decreases, the correction coefficient c2 and the valve opening preceding instruction f2 become small according to the decrease of the IGV opening OP, and the correction valve opening instruction PA2, therefore, the adjustment valve opening instruction PB2 also becomes small according to the decrease of the IGV opening OP, and the valve opening of the auxiliary steam control valve 51 becomes small, so that a steam amount supplied to the heat exchanger 30 decreases according to the decrease of the IGV opening OP.

Since the preceding control where the opening of the auxiliary steam control valve 51 is made large in a preceding manner according to the increase of the IGV opening OP to increase a steam amount supplied to the heat exchanger 30 is performed in this manner, even if the intake air amount increases rapidly according to the increase of the opening of the IGV 11a, the temperature of the intake air A' can be maintained at a stably combustible temperature.

Since the preceding control where the opening of the auxiliary steam control valve 51 is made small in a preceding manner according to the decrease of the IGV opening OP to decrease the steam amount supplied to the heat exchanger 30 is performed, even if the intake air amount decreases rapidly according to the decrease of the opening of the IGV 11a, the temperature of the intake air A' can be maintained at a stably combustible temperature.

Since the temperature difference dt2 becomes large according to lowering of the atmospheric temperature t2, such a preceding control (feedforward control) is performed that the correction coefficient e2 and the valve opening preceding instruction f2 become large according to the lowering of the atmospheric temperature t2, the correction valve opening instruction PA2, therefore, the adjustment valve opening instruction PB2 also becomes large according to the lowering of the atmospheric temperature t2, and the valve opening of the auxiliary steam control valve 51 becomes large, so that the steam amount supplied to the heat exchanger 30 increases according to the lowering of the atmospheric temperature t2.

On the contrary, since the temperature difference dt2 becomes small according to rising of the atmospheric temperature t2, such a preceding control (feedforward control) is performed that the correction coefficient e2 and the valve opening preceding instruction f2 become small according to the rising of the atmospheric temperature t2, the correction valve opening instruction PA2, therefore, the adjustment valve opening instruction PB2 also becomes small according to the rising of the atmospheric temperature t2, and the valve opening of the auxiliary steam control valve 51 becomes small, so that the steam amount supplied to the heat exchanger 30 decreases according to the rising of the atmospheric temperature t2.

Since the steam amount supplied to the heat exchanger 30 is controlled by performing the preceding control of the valve opening of the auxiliary steam control valve 51 according to increase/decrease of the atmospheric temperature t2 in this manner, even if the atmospheric temperature t2 increases/decreases, the temperature of the intake air A' can be maintained at a stably combustible temperature.

Such a preceding control (feedforward control) is performed that, when the steam pressure SP2 increases, the correction coefficient a2 and the valve opening preceding instruction f2 become small according to the increase of the steam pressure SP2, the correction valve opening instruction PA2, therefore, the adjustment valve opening instruction PB2 also becomes small according to the increase of the steam pressure SP2, and the opening of the auxiliary steam control valve 51 becomes small, so that a steam amount supplied to the heat exchanger 30 decreases according to the increase of the steam pressure SP2.

On the contrary, such a preceding control (feedforward control) is performed that, when the steam pressure SP2 decreases, the correction coefficient a2 and the valve opening preceding instruction f2 become large according to the decrease of the steam pressure SP2, the correction valve opening instruction PA2, therefore, the adjustment valve opening instruction PB2 also becomes large according to the decrease of the steam pressure SP2, and the opening of the auxiliary steam control valve 51 becomes large, so that a steam amount supplied to the heat exchanger 30 increases according to the decrease of the steam pressure SP2.

Since the valve opening of the auxiliary steam control valve 51 is controlled in a preceding manner according to increase/decrease of the steam pressure SP2 to control the steam amount supplied to the heat exchanger 30 in this manner, even if the steam pressure SP2 increases/decreases, the temperature of the intake air A' can be maintained at a stably combustible temperature.

Such a preceding control (feedforward control) is performed that, when the steam temperature ST2 increases, the correction coefficient b2 and the valve opening preceding instruction f2 become small according to the increase of the steam temperature ST2, the correction valve opening instruction PA2, therefore, the adjustment valve opening instruction PB2 also becomes small according to the increase of the steam temperature ST2, and the opening of the auxiliary steam control valve 51 becomes small, so that a steam amount supplied to the heat exchanger 30 decreases according to the increase of the steam temperature ST2.

On the contrary, such a preceding control (feedforward control) is performed that, when the steam temperature ST2 decreases, the correction coefficient b2 and the valve opening preceding instruction f2 become large according to the decrease of the steam temperature ST2, the correction valve opening instruction PA2, therefore, the adjustment valve opening instruction PB2 also becomes large according to the decrease of the steam temperature ST2, and the opening of the auxiliary steam control valve 51 becomes large, so that a steam amount supplied to the heat exchanger 30 increases according to the decrease of the steam temperature ST2.

Since the steam amount supplied to the heat exchanger 30 is controlled by controlling the valve opening of the auxiliary steam control valve 51 in a preceding manner according to increase/decrease of the steam temperature ST2, even if the steam temperature ST2 increases/decreases, the temperature of the intake air A' can be maintained at a stably combustible temperature.

<Control Operation of the Self-Generated Steam Control Unit when Generator Output is Equal to or More than a Prescribed Value>

Here, in a case that output of the generator 20 is equal to or more than a prescribed value (for example, 50% of a rated output) and a value of the self-generated steam usage coefficient J outputted from the self-generated steam usage coefficient generating unit 102 is "1", control operation for opening adjustment of the self-generated steam control valve 41 performed by the self-generated steam control unit 200 will be explained.

Incidentally, since the value of the self-generated steam usage coefficient J is "1" at this time, the adjustment valve opening instruction PB2 outputted from the auxiliary steam control unit 300 becomes "0", the auxiliary steam control valve 51 is in a fully closed state, so that only self-generated steam S1 is supplied to the heat exchanger 30.

Because of J=1, the value of the correction valve opening instruction PA1 and the value of the adjustment valve opening instruction PB1 become equal to each other.

When the measurement temperature t1 is low, the valve opening correction instruction P1 and the correction valve opening instruction PA1, therefore, the adjustment valve opening instruction PB1 become large, and the valve opening of the self-generated steam control valve 41 becomes large, so that a steam amount supplied to the heat generator 30 increases.

On the other hand, when the measurement temperature t1 becomes high, the valve opening correction instruction P1 and the correction valve opening instruction PA1, therefore, the adjustment valve opening instruction PB1 become small, and the valve opening of the self-generated steam control valve 41 becomes small, so that a steam amount supplied to the heat generator 30 decreases.

This control is a control operation similar to a conventional feed back control.

Such a preceding control (feedforward control) is performed that, when the gas turbine rotation number N increases, the valve opening instruction d1 and the valve opening preceding instruction f1 increase according to the increase of the gas turbine rotation number N, the correction valve opening instruction PA1, therefore, the adjustment valve opening instruction PB1 also increases according to the increase of the gas turbine rotation number N, and the opening of the self-generated steam control valve 41 increases, so that a steam amount supplied to the heat exchanger 30 increases according to the increase of the gas turbine rotation number N.

On the contrary, such a preceding control (feedforward control) is performed that, when the gas turbine rotation number N decreases, the valve opening instruction d1 and the valve opening preceding instruction f1 decrease according to the decrease of the gas turbine rotation number N, the correction valve opening instruction PA1, therefore, the adjustment valve opening instruction PB1 also decreases according to the decrease of the gas turbine rotation number N, and the opening of the self-generated steam control valve 41 decreases, so that a steam amount supplied to the heat exchanger 30 decreases according to the decrease of the gas turbine rotation number N.

Since the preceding control where the opening of the self-generated steam control valve 41 is increased in a preceding manner according to the increase of the gas turbine rotation number N to increase the steam amount supplied to the heat exchanger 30 is performed in this manner, even if the intake air amount increases according to the increase of the rotation number of the gas turbine 10, the temperature of the intake air A' can be maintained at a stably combustible temperature.

Since the preceding control where the opening of the self-generated steam control valve 41 is decreased in a preceding manner according to the decrease of the gas turbine rotation number N to decrease the steam amount supplied to the heat exchanger 30 is performed in this manner, even if the intake air amount decreases according to the decrease of the rotation number of the gas turbine 10, the temperature of the intake air A' can be maintained at a stably combustible temperature.

Such a preceding control (feedforward control) is performed that, when the IGV opening OP increases, the correction coefficient c1 and the valve opening preceding instruction f1 become large according to the increase of the IGV opening OP, the correction valve opening instruction PA1, therefore, the adjustment valve opening instruction PB1 also becomes large according to the increase of the IGV opening OP, and the valve opening of the self-generated steam control valve 41 becomes large, so that a steam amount supplied to the heat exchanger 30 increases according to the increase of the IGV opening OP.

On the contrary, such a preceding control (feedforward control) is performed that, when the IGV opening OP decreases, the correction coefficient c1 and the valve opening preceding instruction f1 become small according to the decrease of the IGV opening OP, the correction valve opening instruction PA1, therefore, the adjustment valve opening instruction PB1 also becomes small according to the decrease of the IGV opening OP, and the valve opening of the self-generated steam control valve 41 becomes small, so that a steam amount supplied to the heat exchanger 30 decreases according to the decrease of the IGV opening OP.

Since the preceding control where the opening of the self-generated steam control valve 41 is made large in a preceding manner according to the increase of the IGV opening OP to increase the steam amount supplied to the heat exchanger 30 is performed, even if the intake air amount increases rapidly according to increase of the opening of the IGV 11a, the temperature of the intake air A' can be maintained at a stably combustible temperature.

Since the preceding control where the opening of the self-generated steam control valve 41 is made small in a preceding manner according to the decrease of the IGV opening OP to decrease the steam amount supplied to the heat exchanger 30 is performed, even if the intake air amount decreases rapidly according to decrease of the opening of the IGV 11a, the temperature of the intake air A' can be maintained at a stably combustible temperature.

Since the temperature difference dt1 becomes large according to lowering of the atmospheric temperature t2, such a preceding control (feedforward control) is performed that the correction coefficient e1 and the valve opening preceding instruction f1 become large according to the lowering of the atmospheric temperature t2, the correction valve opening instruction PA1, therefore, the adjustment valve opening instruction PB1 also becomes large according to the lowering of the atmospheric temperature t2, and the valve opening of the self-generated steam control valve 41 becomes large, so that a steam amount supplied to the heat exchanger 30 increases according to the lowering of the atmospheric temperature t2.

On the contrary, since the temperature difference dt1 becomes small according to rising of the atmospheric temperature t2, such a preceding control (feedforward control) is performed that the correction coefficient e1 and the valve opening preceding instruction f1 become small according to the rising of the atmospheric temperature t2, the correction valve opening instruction PA1, therefore, the adjustment valve opening instruction PB1 also becomes small according to the rising of the atmospheric temperature t2, and the valve opening of the self-generated steam control valve 41 becomes small, so that a steam amount supplied to the heat exchanger 30 decreases according to the rising of the atmospheric temperature t2.

Since the valve opening of the self-generated steam control valve 41 is controlled in a preceding manner according to increase/decrease of the atmospheric temperature t2 to control the steam amount supplied to the heat exchanger 30, even if the atmospheric temperature t2 increases/decreases, the temperature of the intake air A' can be maintained at a stably combustible temperature.

Such a preceding control (feedforward control) is performed that, when the steam pressure SP1 increases, the correction coefficient a1 and the valve opening preceding instruction f1 become small according to the increase of the steam pressure SP1, the correction valve opening instruction PA1, therefore, the adjustment valve opening instruction PB1 also becomes small according to the increase of the steam pressure SP1, and the opening of the self-generated steam control valve 41 becomes small, so that a steam amount supplied to the heat exchanger 30 decreases according to the increase of the steam pressure SP1.

On the contrary, such a preceding control (feedforward control) is performed that, when the steam pressure SP1 decreases, the correction coefficient a1 and the valve opening preceding instruction f1 become large according to the decrease of the steam pressure SP1, the correction valve opening instruction PA1, therefore, the adjustment valve opening instruction PB1 also becomes large according to the decrease of the steam pressure SP1, and the opening of the self-generated steam control valve 41 becomes large, so that a steam amount supplied to the heat exchanger 30 increases according to the decrease of the steam pressure SP1.

Thus, since the valve opening of the self-generated steam control valve 41 is controlled in a preceding manner according to increase/decrease of the steam pressure SP1 to control the steam amount supplied to the heat exchanger 30, even if the steam pressure SP1 increases/decreases, the temperature of the intake air A' can be maintained at a stably combustible temperature.

Such a preceding control (feedforward control) is performed that, when the steam temperature ST1 increases, the correction coefficient b1 and the valve opening preceding instruction f1 become small according to the increase of the steam temperature ST1, the correction valve opening instruction PA1, therefore, the adjustment valve opening instruction PB1 also becomes small according to the increase of the steam temperature ST1, and the opening of the self-generated steam control valve 41 becomes small, so that a steam amount supplied to the heat exchanger 30 decreases according to the increase of the steam temperature ST1.

On the contrary, such a preceding control (feedforward control) is performed that, when the steam temperature ST1 decreases, the correction coefficient b1 and the valve opening preceding instruction f1 become large according to the decrease of the steam temperature ST1, the correction valve opening instruction PA1, therefore, the adjustment valve opening instruction PB1 also becomes large according to the decrease of the steam temperature ST1, and the opening of the self-generated steam control valve 41 becomes large, so that a steam amount supplied to the heat exchanger 30 increases according to the decrease of the steam temperature ST1.

Thus, since the valve opening of the self-generated steam control valve 41 is controlled in a preceding manner according to increase/decrease of the steam temperature ST1 to control the steam amount supplied to the heat exchanger 30, even if the steam temperature ST1 increases/decreases, the temperature of the intake air A' can be maintained at a stably combustible temperature.

<First Switching Control Operation for Performing Switching from Auxiliary Steam to Self-Generated Steam>

Next, switching control operation performed when steam supplied to the heat exchanger 30 is switched from auxiliary steam S2 to self-generated steam S1 will be explained with reference to FIG. 1 and FIG. 4.

At a start-up time, the self-generated steam control valve 41 is in a fully closed state, and the opening of the auxiliary steam control valve 51 is controlled by the auxiliary steam control unit 300. Therefore, only auxiliary steam S2 is supplied to the heat exchanger 30 at the start-up time.

At this time, the value of the self-generated steam usage coefficient J outputted from the self-generated steam usage coefficient generating unit 102 is "0", and the value of the adjustment valve opening instruction PB2 outputted from the auxiliary steam control unit 300 is equal to the value of the correction valve opening instruction PA2.

Since the adjustment valve opening instruction PB2 (=PA2) includes not only the valve opening correction instruction P2 for performing feedback control but also the valve opening preceding instruction f2 for performing feedforward control, control for causing the temperature of the intake air A' to coincide with the target temperature TO can be performed more reliably by performing opening control of the auxiliary steam control valve 51 according to the adjustment valve opening instruction PB2.

When the output of the generator 20 becomes the prescribed value (for example, 50% of the rated output) or higher (the time point "α" in FIG. 4), the steam source switching signal generating unit 101 output a steam source switching signal TS2. The steam source switching signal TS2 is inputted into the self-generated steam usage coefficient generating unit 102 and the adding unit 318 of the auxiliary steam control unit 300.

Incidentally, even before the output of the generator 20 becomes the prescribed value (for example, 50% of the rated output) or higher, calculation operation of the self-generated steam control unit 200 itself is performed, but because the value of the self-generated steam usage coefficient J is "0", the value of the adjustment valve opening instruction PB1 becomes "0", so that actual opening/closing control of the self-generated steam control valve 41 according to the adjustment valve opening instruction PB1 is not performed.

When the steam source switching signal TS2 is inputted into the self-generated steam usage coefficient generating unit 102, the self-generated steam usage coefficient generating unit 102 outputs a self-generated steam usage coefficient J whose value gradually (linearly) increases from "0" to "1" in a predetermined set time T1 from a time point α (a time period from a time point α to a time point β in FIG. 4) and becomes "1" after the set time T1 elapsing (after the time point β).

The adding unit 318 in the auxiliary steam control unit 300 tracks (holds) the value of the correction valve opening instruction PA2 at the time point of input of the steam source switching signal TS2 and continues to output the correction valve opening correction instruction PA2 which is the tracked value.

Since the self-generated steam usage coefficient J gradually increases in the auxiliary steam control unit 300 in a period from the time point α to a time point β, the difference value (1−J) gradually decreases. As a result, the adjustment valve opening instruction PB2 obtained by multiplying the correction valve opening instruction PA2 whose value has been tracked the value by the difference value (1−J) gradually (linearly) decreases at a constant rate to reach "0" at the time point β.

Therefore, the opening of the auxiliary steam control valve 51 becomes small at a constant rate according to the adjustment valve opening instruction PB2 whose value gradually (linearly) decreases at a constant rate, and the supply amount of auxiliary steam S2 supplied to the heat exchanger 30 decreases from an amount corresponding to the tracked correction valve opening instruction PA2 at a constant rate in a period from the time point α to a time point β to reach 0.

On the other hand, the self-generated steam usage coefficient J gradually increases in the self-generated steam control unit 200 in the period from the time point α to a time point β so that the adjustment valve opening instruction PB1 obtained by multiplying the correction valve opening instruction PA1 by the self-generated steam coefficient J increases.

Accordingly, the opening of the self-generated steam control valve 41 increases according to the adjustment valve opening instruction PB1 whose value increases and the supply amount of self-generated steam S1 supplied to the heat exchanger increases according to the adjustment valve opening instruction PB1 in a period from the time point α to the time point β.

Since the adjustment valve opening instruction PB1 (=PA1×J) includes not only the valve opening correction instruction P1 for performing feedback control but also the valve opening preceding instruction f1 for performing feedforward control at this time, control for causing the temperature of the intake air A' to coincide with the target temperature TO can be performed more reliably by performing opening control of the self-generated steam control valve 41 according to the adjustment valve opening instruction PB1.

As a result, the adjustment valve opening instruction PB2 outputted from the auxiliary steam control unit 300 decreases at a constant rate in the period from the time point α to the time point β, so that the correction steam control valve 51 is closed at a constant rate, but the adjustment valve opening instruction PB1 outputted from the self-generated steam control unit 200 gradually increases and the self-generated steam control valve 41 is opened while being controlled according to feedback control and feedforward control.

As a result, even if steam to be supplied to the heat exchanger 30 is switched from auxiliary steam S2 to self-generated steam S1, control for maintaining the temperature of the intake air A' at the target temperature TO can be performed reliably.

<Second Switching Control Operation for Performing Switching from Self-Generated Steam to Auxiliary Steam>

Next, switching control operation for switching steam supplied to the heat exchanger 30 from self-generated steam S1 to auxiliary steam S2 will be explained with reference to FIG. 1 and FIG. 4.

In a steady operation time (a period from the time point β to a time point γ in FIG. 4) where the generator output is equal to or higher than the prescribed value (for example, 50% of the rated output), the auxiliary steam control valve 51 is in a fully closed state and the opening of the self-generated steam control valve 41 is controlled by the self-generated steam control unit 200. Therefore, only self-generated steam S1 is supplied to the heat exchanger 30 in the steady operation time.

At this time, the value of the self-generated steam usage coefficient J outputted from the self-generated steam usage coefficient generating unit 102 is "1" and the value of the adjustment valve opening instruction PB1 outputted from the self-generated steam control unit 200 is equal to the value of the correction valve opening instruction PA1.

Since the adjustment valve opening instruction PB1 (=PA1) includes not only the valve opening correction instruction P1 for performing feedback control but also the valve opening preceding instruction f1 for performing feedforward control, control for causing the temperature of intake air A' to coincide with the target temperature TO can be performed more reliably by performing opening control of the self-generated steam control valve 41 according to the adjustment valve opening instruction PB1.

When the output of the generator 20 becomes less than the prescribed value (for example, 50% of the rated output) (the time point γ in FIG. 4), the steam source switching signal generating unit 101 outputs a steam source switching signal TS1. The steam source switching signal TS1 is inputted into the self-generated steam usage coefficient generating unit 102 and the adding unit 218 of the self-generated steam control unit 200.

Incidentally, even before the output of the generator 200 becomes less than the prescribed value (for example, 50% of the rated output), calculation operation of the auxiliary steam control unit 300 itself is performed, but because the value of the self-generated steam usage coefficient J becomes "1" so that the difference value (1−J) is "0", the value of the adjustment valve opening instruction PB2 becomes "0" so that actual opening/closing operation of the auxiliary steam control valve 51 according to the adjustment valve opening instruction PB2 is not performed.

When the steam source switching signal ST1 is inputted into the self-generated steam usage coefficient generating unit 102, the self-generated steam usage coefficient generating unit 102 outputs a self-generated steam usage coefficient J whose value gradually (linearly) decreases from "1" to "0" in a predetermined set time T1 from the time point γ (the time period from the time point γ to the time point δ in FIG. 4) and becomes "0" after elapsing of the set time T1 (after the time point δ).

The adding unit 218 in the self-generated steam control unit 200 tracks (holds) a value of the correction valve opening instruction PA1 at the time point of input of the steam source switching signal TS1 (at the time point γ) and continues to output the correction valve opening instruction PA1 which is the tracked value.

Since the self-generated steam usage coefficient J gradually decreases in the self-generated steam control unit 200 in a period from the time point γ to the time point δ, the adjustment valve opening correction instruction PB1 obtained by multiplying the correction valve opening instruction PA1 whose value has been tracked by the self-generated steam usage coefficient J gradually (linearly) decreases at a constant rate and a value thereof becomes "0" at the time point δ.

Accordingly, the opening of the self-generated steam control valve 41 decreases at a constant rate according to the adjustment valve opening instruction PB1 whose value gradually (linearly) decreases at a constant rate, and the supply amount of self-generated steam S1 supplied to the heat exchanger 30 decreases from an amount corresponding to the tracked correction valve opening instruction PA1 in a period from the time point γ to the time point δ to reach 0.

On the other hand, since the self-generated steam usage coefficient J gradually decreases in the auxiliary steam control unit 300 in the period from the time point γ to the time point δ so that the difference value (1−J) increases, the adjustment valve opening instruction PB2 obtained by multiplying the correction valve opening instruction PA2 by the difference value (1−J) increases.

Accordingly, the opening of the auxiliary steam control valve 51 increases according to the adjustment valve opening instruction PB2 whose value increases and the supply amount of auxiliary steam S2 supplied to the heat exchanger 30 increases according to the adjustment valve opening instruction PB2 in the period from the time point γ to the time point δ.

At this time, since the adjustment valve opening instruction PB2 (=PA2×(1−J)) includes not only the valve opening correction instruction P2 for performing feedback control but also the valve opening preceding instruction f2 for performing feedforward control, control for causing the temperature of intake air A' to coincide with the target temperature TO can be performed more reliably by performing opening control of the auxiliary steam control valve 51 according to the adjustment valve opening instruction PB2.

As a result, the adjustment valve opening instruction PB1 outputted from the self-generated steam control unit 200 decrease at a constant rate in a period from the time point γ to the time point δ and the self-generated steam control valve 41 is closed at a constant rate, but the adjustment valve opening instruction PB2 outputted from the auxiliary steam control unit 300 gradually increases and the auxiliary steam control valve 51 is opened while being controlled according to feedback control and feedforward control.

As a result, even if steam supplied to the heat exchanger 30 is switched from self-generated steam S1 to auxiliary steam S2, control for maintaining the temperature of the intake air A' at the target temperature TO can be performed reliably.

Incidentally, in the abovementioned embodiment, the valve opening control is performed by a combination of feedback control and feedforward control (preceding control) in both the self-generated steam control unit 200 and the auxiliary steam control unit 300, but the present invention can be applied to a case that a control unit where the valve opening control is performed by only feedback control is adopted for the self-generated steam control unit and the auxiliary steam control unit.

The invention claimed is:

1. An apparatus for controlling intake air heating of a gas turbine comprising:
   a heat exchanger which is supplied with self-generated steam whose supply amount is controlled in response to a valve opening of a self-generated steam control valve and auxiliary steam whose supply amount is controlled in response to a valve opening of an auxiliary steam control valve to heat air which is taken by a gas turbine utilizing supplied steam;
   a thermometer which measures the temperature of air which is heated by the heat exchanger and taken by the gas turbine;
   a steam source switching signal generating unit which outputs a first steam source switching signal when output of a generator rotationally driven by the gas turbine decreases from a value equal to or higher than a predetermined prescribed value to a value less than the prescribed value and which outputs a second steam source switching signal when the output of the generator increases from a value less than the predetermined prescribed value to a value equal to or higher than the prescribed value;
   a self-generated steam usage coefficient generating unit which outputs a self-generated steam usage coefficient whose value gradually changes from 1 to 0 along time elapsing in a predetermined set time when the first steam source switching signal is outputted and whose value gradually changes from 0 to 1 along time elapsing in a predetermined set time when the second steam source switching signal is outputted;
   a self-generated steam control unit which feeds a self-generated steam correction valve opening instruction obtained by adding a self-generated steam valve opening correction instruction for performing feedback control so as to make a deviation between a measurement temperature measured by the thermometer and a preset target temperature zero and a self-generated steam valve opening preceding instruction for performing preceding control such that the measurement temperature reaches the target temperature to the self-generated steam control valve, thereby controlling a valve opening of the self-generated steam control valve; and
   an auxiliary steam control unit which feeds an auxiliary steam correction valve opening instruction obtained by adding an auxiliary steam valve opening correction instruction for performing feedback control so as to make a deviation between the measurement temperature and the preset target temperature zero and an auxiliary steam valve opening preceding instruction for performing preceding control such that the measurement temperature reaches the target temperature to the auxiliary steam control valve, thereby, controlling a valve opening of the auxiliary steam control valve, wherein
   when the first steam source switching signal is outputted, the self-generated steam control unit maintains a value of the self-generated steam correction valve opening instruction at a time point when the first steam source switching signal is outputted and gradually decreases the value of the self-generated steam correction valve opening instruction from a held value of the self-generated steam correction valve opening instruction to zero in a predetermined set time, while the auxiliary steam control unit controls a valve opening of the auxiliary steam control valve according to an auxiliary steam adjustment valve opening instruction obtained by multiplying the auxiliary steam correction valve opening instruction by a difference value obtained from subtracting the self-generating steam usage coefficient from a value of 1, and
   when the second steam source switching signal is outputted, the auxiliary steam control unit maintains a value of the auxiliary steam correction valve opening instruction at a time point when the second steam source switching signal is outputted and gradually decreases the value of the auxiliary steam correction valve opening instruction from the held value of the self-generated steam correction valve opening instruction to 0 in a predetermined set time, while the self-generated steam control unit controls a valve opening of the self-generated steam control valve according to a self-generated steam adjustment valve opening instruction obtained by multiplying the self-generated steam correction valve opening instruction by the self-generated steam usage coefficient.

2. The apparatus for controlling intake air heating of a gas turbine according to claim 1, wherein
the self-generated steam control unit comprises:
a deviation calculating unit for self-generated steam which obtains a deviation temperature for self-generated steam which is the deviation between the target temperature and the measurement temperature;
a proportional-integral calculating unit for self-generated steam which performs proportional-integral calculation of the deviation temperature for self-generated steam to obtain a valve opening correction instruction for self-generated steam;
a second deviation calculating unit for self-generated steam which obtains a temperature difference between the target temperature and an atmospheric temperature;
a valve opening instruction calculation function unit for self-generated steam which outputs a valve opening instruction for self-generated steam whose value becomes large when a rotation number of the gas turbine increases;
an inlet guide vane correction coefficient calculation function unit for self-generated steam which outputs an inlet guide vane correction coefficient for self-generated steam whose coefficient value becomes large when an opening of an inlet guide vane of the gas turbine increases;
a temperature difference correction coefficient calculation function unit for self-generated steam which outputs a temperature difference correction coefficient for self-generated steam whose coefficient value becomes large when the temperature difference increases;
a steam pressure correction coefficient calculation function unit for self-generated steam which outputs a steam pressure correction coefficient for self-generated steam whose coefficient value becomes 1 when a pressure of self-generated steam supplied to the heat exchanger is equal to a predetermined reference pressure, whose coefficient value becomes smaller than 1 when the pressure becomes larger than the reference pressure, and whose coefficient value becomes larger than 1 when the pressure becomes smaller than the reference pressure;
a steam temperature correction coefficient calculation function unit for self-generated steam which outputs a steam temperature correction coefficient for self-generated steam whose coefficient value becomes 1 when a temperature of self-generated steam supplied to the heat exchanger is equal to a predetermined reference temperature, whose coefficient value becomes smaller than 1 when the temperature becomes larger than the reference temperature, and whose coefficient value becomes larger than 1 when the temperature becomes smaller than the reference temperature;
a multiplying unit for self-generated steam which performs multiplication of the valve opening instruction for self-generated steam, the inlet guide vane correction coefficient for self-generated steam, the temperature difference correction coefficient for self-generated steam, the steam pressure correction coefficient for self-generated steam, and the steam temperature correction coefficient for self-generated steam to output a valve opening preceding instruction for self-generated steam; and
an adding unit for self-generated steam which adds the valve opening correction instruction for self-generated steam and the valve opening preceding instruction for self-generated steam to output a correction valve opening instruction for self-generated steam, and
the auxiliary steam control unit comprises:
a deviation calculating unit for auxiliary steam which obtains a deviation temperature for auxiliary steam which is the deviation between the target temperature and the measurement temperature;
a proportional-integral calculating unit for auxiliary steam which performs proportional-integral calculation of the deviation temperature for auxiliary steam to obtain a valve opening correction instruction for auxiliary steam;
a second deviation calculating unit for auxiliary steam which obtains a temperature difference between the target temperature and an atmospheric temperature;
a valve opening instruction calculation function unit for auxiliary steam which outputs a valve opening instruction for auxiliary steam whose value becomes large when the rotation number of the gas turbine increases;
an inlet guide vane correction coefficient calculation function unit for auxiliary steam which outputs an inlet guide vane correction coefficient for auxiliary steam whose coefficient value becomes large when the opening of the inlet guide vane of the gas turbine increases;
a correction coefficient calculation function unit for auxiliary steam temperature difference which outputs a temperature difference correction coefficient for auxiliary steam whose coefficient value becomes large when the temperature difference becomes large;
a steam pressure correction coefficient calculation function unit for auxiliary steam which outputs a steam pressure correction coefficient for auxiliary steam whose coefficient value becomes 1 when a pressure of auxiliary steam supplied to the heat exchanger is equal to a predetermined reference pressure, whose coefficient value becomes smaller than 1 when the pressure becomes larger than the reference pressure, and whose coefficient value becomes larger than 1 when the pressure becomes smaller than the reference pressure;
a steam temperature correction coefficient calculation function unit for auxiliary steam which outputs a steam temperature correction coefficient for auxiliary steam whose coefficient value becomes 1 when a temperature of auxiliary steam supplied to the heat exchanger is equal to a predetermined reference temperature, whose coefficient value becomes smaller than 1 when the temperature becomes larger than the reference temperature, and whose coefficient value becomes larger than 1 when the temperature becomes smaller than the reference temperature;
a multiplying unit for auxiliary steam which performs multiplication of the valve opening instruction for auxiliary steam, the inlet guide vane correction coefficient for auxiliary steam, the temperature difference correction coefficient for auxiliary steam, the steam pressure correction coefficient for auxiliary steam, and the steam temperature correction coefficient for auxiliary steam to output a valve opening preceding instruction for auxiliary steam; and
an adding unit for auxiliary steam which adds the valve opening correction instruction for auxiliary steam and the valve opening preceding instruction for auxiliary steam to output a correction valve opening instruction for auxiliary steam.

* * * * *